July 19, 1949.   D. F. COLBATH   2,476,702
TEMPERATURE CONTROL DEVICE
Filed April 26, 1946   2 Sheets-Sheet 1
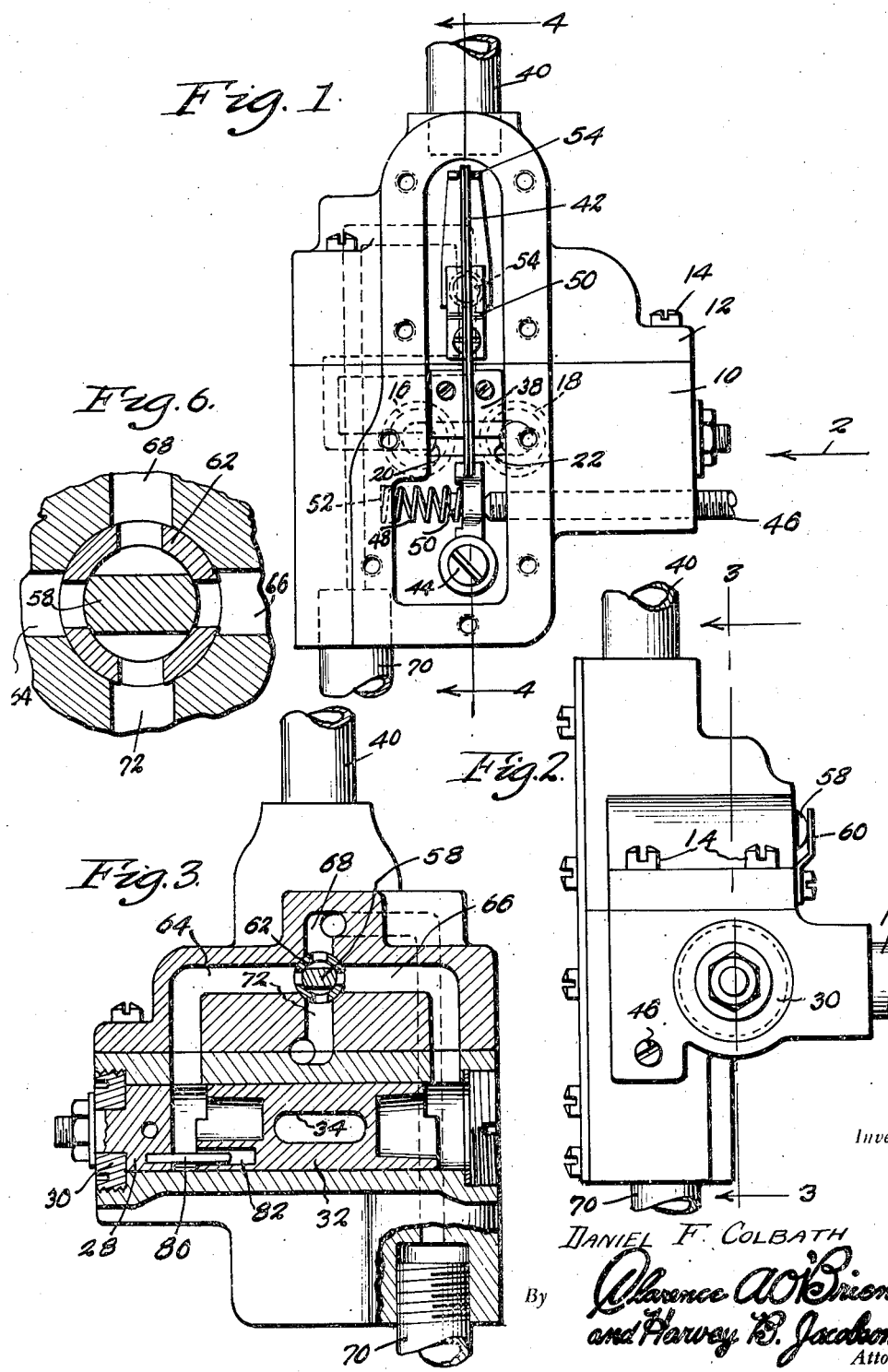
Inventor
DANIEL F. COLBATH

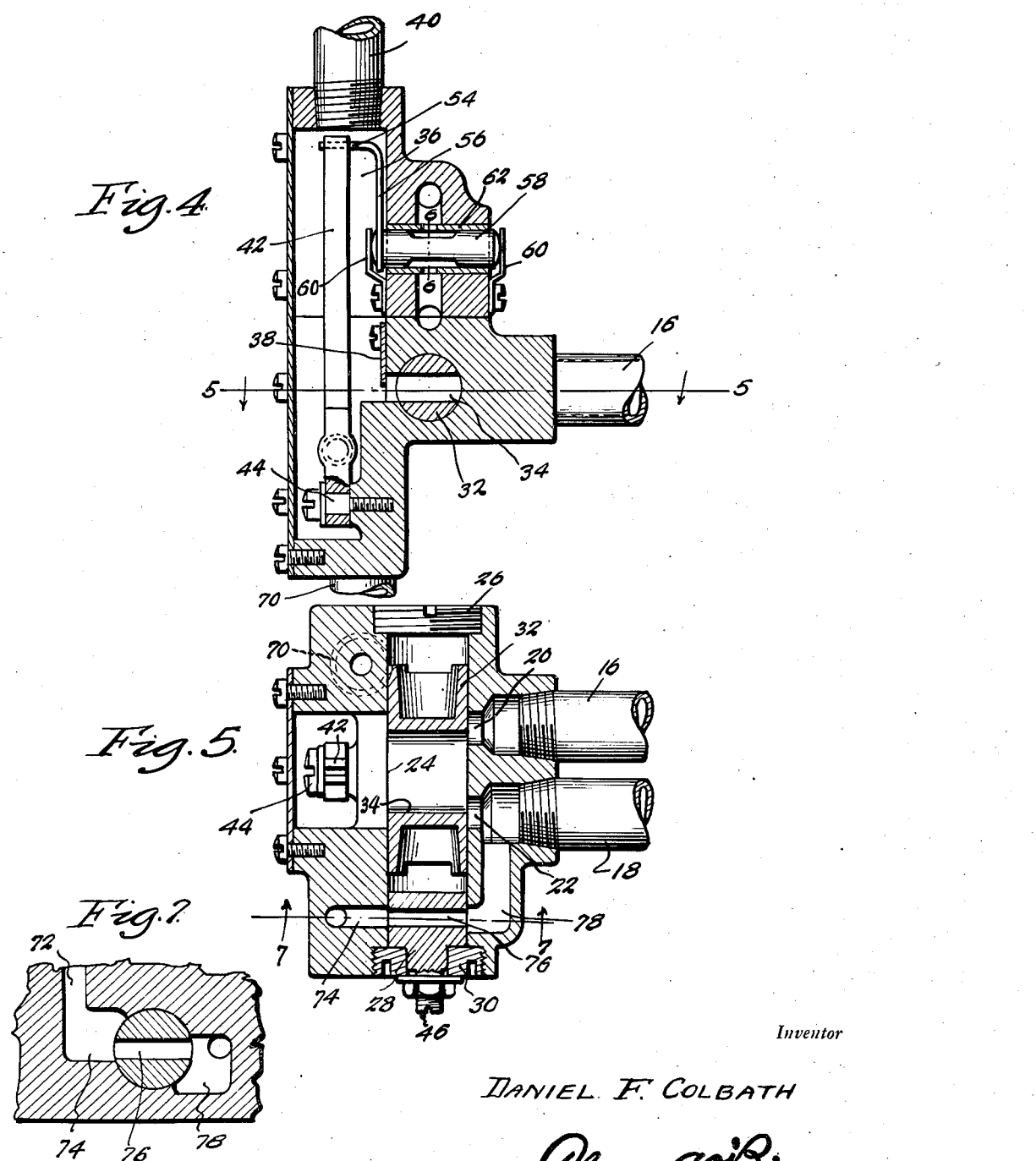

Patented July 19, 1949

2,476,702

UNITED STATES PATENT OFFICE 2,476,702

TEMPERATURE CONTROL DEVICE

Daniel F. Colbath, Dallas, Tex.

Application April 26, 1946, Serial No. 665,173

7 Claims. (Cl. 236—12)

The present invention relates to a temperature control device and more especially comprises novel and useful improvements in an automatic mixing valve for hot and cold water lines for delivering water at a predetermined temperature.

An important object of this invention is to provide an attachment for plumbing which is capable of mixing hot and cold water and delivering the resultant water at a constant temperature regardless of the quantity desired.

Another important object of my invention is the provision of a means in accordance with the foregoing object for easily and efficiently varying the temperature of the water delivered by the device.

A still further important object of my invention is the arrangement of a device in accordance with each of the foregoing objects which shall have an improved and more thorough and efficient mixing action upon the hot and cold water.

Yet another important object of my invention is the formulation of a novel means whereby the water pressure may be utilized to actuate the mixing valve in accordance with fluctuations of temperature in the mixing chamber.

An additional object of my invention is the provision of manual means for manipulating the proportioning valve to vary and throttle the delivery of the mixed water from zero to a maximum.

Another important object of my invention is the development of a manual means for locking out the automatic mixing valve when it is desired to cut off the flow of water.

Additional important objects of my invention are the arrangement of a device which shall be compact, serviceable, efficient, inexpensive and which may be readily attached to existing plumbing systems in order to attain the foregoing objects.

These together with numerous other objects of the invention which will become more apparent as the following description proceeds, are attained by my invention, one embodiment of which has been illustrated merely by way of example, in the attached drawings, wherein:

Figure 1 is a front elevation of the device with the cover of the mixing chamber removed to show certain parts exposed in the interior thereof;

Figure 2 is an end elevation of Figure 1 looking from the right end thereof;

Figure 3 is a vertical sectional view taken upon the line 3—3 in Figure 2 and looking in the direction of the arrow;

Figure 4 is a vertical sectional view taken substantially upon the line 4—4 of Figure 1 and looking in the direction of the arrow;

Figure 5 is a horizontal sectional view taken upon the line 5—5 of Figure 4 and looking in the direction of the arrow;

Figure 6 is a vertical sectional view through the control valve and is taken upon the line 6—6 of Figure 4; and, Figure 7 is a horizontal sectional view taken substantially upon the line 7—7 of Figure 5 and looking in the direction of the arrow.

Referring now more particularly to the drawings, there is disclosed a valve casing consisting of a lower section 10 secured to an upper section 12 upon a horizontal plane as by bolts 14. The casing 10 is threaded to receive a hot water inlet supply line 16 and a cold water inlet supply line 18, ports 20 and 22 respectively connecting these inlet lines with a horizontally disposed bore 24 closed at one end as by an internally threaded cap 26 and at the other end by a rotatable plug 28 secured in place by a screw-threaded gland 30. Slidingly disposed in this horizontal chamber, is a piston valve 32 having a centrally disposed aperture or slot 34 which communicates with the mixing chamber 36. A baffle member 38 is secured to the well of the mixing chamber and partially throttles the outlet or discharge from the central aperture 34 of the reciprocating piston valve 32 for a purpose to be hereinafter disclosed.

As shown more particularly in Figure 5, the piston valve 32 and its aperture 34 are so proportioned with respect to the ports 20 and 22, that the valve member 32 serves to proportion the rate of flow from each of the hot and cold water lines 16 and 18. Thus, as the valve member is moved downwardly in Figure 5, it cuts off the flow from the port 20 while opening the port 22 thereby reducing the amount of hot water and increasing the quantity of cold water fed through the passage 34 into the mixing chamber. Conversely, as the valve rises it throttles the cold water supply while opening the hot water supply to raise the temperature of the mixed fluid in the mixing chamber. It will be here noted that the partially restricted or partially throttled ports 20 and 22 produce a turbulence in the hot and cold water supply which initiates a mixing action in the transverse central passageway 34 of the proportioning valve and as this partially mixed fluid passes beneath the baffling means 38 additional turbulence is produced to further augment the mixing action and enhance the mixing effect in the mixing chamber 36. From the mixing chamber 36 the combined hot and cold water passes through the discharge line 40 to the point of use. Attention is now directed more specifically to Figures 1 and 4 which show the novel means for controlling the proportioning of the hot and cold water into the mixing chamber. A bimetallic thermostatic element of the leaf type indicated generally at 42 is journalled upon a fulcrum screw 44 at its lower end, an adjusting screw 46 extending exteriorly of the casing 10 serving to urge the thermostat in one direction against the resilient opposition of a spring means 48 seated upon a projecting portion 50 of the thermostat and in a recess 52 in the casing 10. The upper end of the thermostat passes loosely through the slotted end 54 of a lever 56 which is secured to the end of a cylindrical and oscillating distributing valve 58 disposed in a horizontal bore in the upper casing member 12. A pair of resilient fingers 60 secured to the casing 12 in any desired manner, press upon the convexed ends of the cylindrical valve member 58 to center the same in its bore. Disposed between the cylindrical valve 58 and its bore is a sleeve member 62 constituting a seat for said valve. Horizontally disposed passageways 64 and 66 extend from opposite sides of the valve sleeve 62 to opposite ends of the horizontal bore 24 containing the reciprocating proportioning valve 32. Extending vertically upwardly from the valve sleeve 62 is a conduit 68 which as indicated by dotted lines in Figure 3 communicates with the downwardly extending waste or discharge line 70. Depending from below the sleeve 62 is a conduit 72 continuing through the casing to a laterally disposed bore 74 which is aligned with a transverse passage 76 in the plug member 28 and communicates with an enlarged passage 78 that merges with the cold water line 18 adjacent the port 22.

From the foregoing, it will be seen that a portion of the cold water supply passes by way of passages 78 and the bore 76 in plug 28, the conduit 74 and thence by way of passages 72 to the underside of the control valve of the control valve sleeve 62 and then through the control valve to the selected passage 64 or 66. Depending uopn the position of the control valve the pressure fluid is then fed to either end of the cylinder and causes the reciprocation of the piston valve 32 therein, the latter adjusting the proportionate flow of hot and cold water to the mixing chamber. As the piston valve reciprocates under the urge of the pressure from the cold water supply, the chamber at the other end of the piston valve is placed in communication by the opposite side of the distributing valve 58 with the upper vertical discharge line 68 and thence passes to the waste pipe 70 thus relieving the pressure in the opposite chamber which might tend to oppose the movement of the proportioning valve. When there is any change in the temperature of the mixed fluid in the mixing chamber 36 such as might arise by a change in the hot or cold water fed to the chamber 36, the thermostatic means 42 suitably biases the lever 56 and shifts the control valve 58 causing proper actuation of the reciprocating valve 32 to readjust the water supply to insure the maintenance of the predetermined and desired temperature of the admixed waters. When it is desired to change the temperature of the water delivered by the device the adjusting screw 46 may be manually adjusted thus biasing the thermostat 42 by a predetermined amount against the resistance of the spring 48, thus modifying its operation upon the control valve to insure in effect delivery of the water at the new predetermined temperature.

In order to throttle the water supply without changing the proportionate flow of hot and cold water the structure shown more clearly in Figure 3 is utilized. The cap member 28 is provided near its periphery with a longitudinally extending end 80 fixedly mounted in said cap and slidably extending in a bore 82 disposed longitudinally in the reciprocating valve member 32 adjacent the periphery thereof. It will thus be evident that as the cap or plug 28 is rotated the pin 88 causes a corresponding rotation of the freely reciprocable valve member upon its central axis, and as this rotation occurs, the transverse passageway or groove 34 will become inclined to the axis of the ports 20 and 22 thereby restricting or throttling their delivery without changing the relative proportion of water delivered by each. As will be readily understood, suitable graduations or indicia may be provided to indicate the extent of adjustment of the thermostatic adjusting means 46 and the throttling means 28.

As shown more fully in Figure 7, the cold water passage 78 leading to the plug 28 and the passage 74 extending from the plug are suitably enlarged adjacent plug 28 whereby the bore 76 will maintain full communication with both passages until it is cut off for vertical position. This insures that the only throttling action effected is that upon the hot and cold water supply delivered to the mixing chamber while the full and free flow of cold water is effected through the bore 76 to the distributing valve to insure quick and efficient actuation of the member 32 in response to energization by the thermostat member 42.

Although I have described this invention as applied to a plumbing system for mixing hot and cold water to produce a combined fluid having a constant predetermined temperature, it will be evident that it may be employed to mix and maintain a constant temperature of other liquids in other environments.

In some installations it may be desirable in the inerests of increased sensitivity to temperature changes and for temperature control, as well as because of compactness in the arrangement of the mechanism to form the bi-metallic thermostat 42 as a spiral rather than as a straight strip.

I, therefore, wish it to be understood that I do not limit myself to the exact construction shown but I may avail myself of modifications falling within the scope of the appended claims.

I claim as my invention:

1. In a device of the character described, a casing, a hot and a cold water port in said casing, a mixing chamber in said casing, a proportioning valve reciprocatingly disposed across said inlet ports, a transverse port in said proportioning valve connecting said inlet ports with said mixing chamber, said proportioning valve adjustably controlling the ratio of hot water to cold water supplied to said mixing chamber, and means to rotate said proportioning valve to throttle in fixed proportion the ports of said hot and cold water inlet, said means including a rotatable plug, a key on the periphery of said plug and slidably disposed in a key-way in said proportioning valve to produce controlled rotation of the latter in response to predetermined rotation of the plug.

2. In a device of the character described, a casing, a hot and a cold water port in said casing, a mixing chamber in said casing, a proportioning valve reciprocatingly disposed across said inlet ports, a transverse port in said proportioning valve connecting said inlet ports with said mixing chamber, said proportioning valve adjustably controlling the ratio of hot water to cold water supplied to said mixing chamber, and means to rotate said proportioning valve to throttle in fixed proportion the ports of said hot and cold water inlet, said means including a rotatable plug, a key on the periphery of said plug and slidably disposed in a key-way in said proportioning valve to produce controlled rotation of the latter in response to predetermined rotation of the plug, and a bore extending through said plug and establishing communication between said cold water inlet and an end of said reciprocating valve, and thermostatic means disposed in said mixing chamber for controlling the flow of cold water selectively to opposite ends of said proportioning valve to reciprocate the latter for admitting controlled relative quantities of water from said inlet ports to said mixing chamber.

3. A mixing device comprising, a casing, a mixing chamber in said casing, hot and cold water inlet ports communicating with said casing, a proportioning valve controlling delivery from said inlet ports into said mixing chamber including operating pistons, a transverse port in said proportioning valve proportioning flow from said inlet ports into said mixing chamber, a control valve in said casing, a bypass channel connected to said cold water port and to said control valve, and passages connected directly to said control valve and to said operating pistons for shifting said proportioning valve to adjustably control the ratio of hot water to cold water supplied to said mixing chamber.

4. A mixing device comprising, a casing, a mixing chamber in said casing, hot and cold water inlet ports communicating with said casing, a proportioning valve controlling delivery from said inlet ports into said mixing chamber including operating pistons, a transverse port in said proportioning valve proportioning flow from said inlet ports into said mixing chamber, a control valve in said casing, a bypass channel connected to said cold water port and to said control valve, and passages connected directly to said control valve and to said operating pistons for shifting said proportioning valve to adjustably control the ratio of hot water to cold water supplied to said mixing chamber, and means to rotate said proportioning valve to throttle in fixed proportion the ports of said hot and cold water inlets.

5. The combination of claim 4 wherein said means include a rotatable plug, a key in the periphery of said plug and slidably disposed in a keyway in said proportioning valve to produce controlled rotation of the latter in response to predetermined rotation of the plug.

6. A mixing device comprising, a casing, a mixing chamber in said casing, hot and cold water inlet ports communicating with said casing, a proportioning valve controlling delivery from said inlet ports into said mixing chamber including operating pistons, a transverse port in said proportioning valve proportioning flow from said inlet ports into said mixing chamber, a control valve in said casing, a bypass channel connected to said cold water port and to said control valve, and passages connected directly to said control valve and to said operating pistons for shifting said proportioning valve to adjustably control the ratio of hot water to cold water supplied to said mixing chamber, and a vent passage connected directly to said control valve and to the exterior of the casing.

7. In a device of the character described, a casing, a hot and a cold water port in said casing, a mixing chamber in said casing, a proportioning valve reciprocatingly disposed across said inlet ports, a transverse port in said proportioning valve connecting said inlet ports with said mixing chamber, said proportioning valve adjustably controlling the ratio of hot water to cold water supplied to said mixing chamber, and thermostatic means disposed in said mixing chamber for adjusting said proportioning valve to maintain a predetermined temperature in said mixing chamber, said thermostatic means including selective means for applying the pressure at said cold water inlet to selectively reciprocate said proportioning valve, said selective means including an oscillating valve, operating linkage between said thermostat and said oscillating valve, and passage means from said cold water inlet and selectively connected by said oscillating valve to one side of said proportioning valve to reciprocate the same, and a baffle plate mounted in said mixing chamber below said thermostatic means for increasing the velocity of flow from said inlet ports to insure complete mixing of hot and cold water prior to contact with said thermostatic means.

DANIEL F. COLBATH.

REFERENCES CITED

The following references are of record in the file of this patent:

UNITED STATES PATENTS

| Number | Name | Date |
|---|---|---|
| 375,508 | Rodman | Dec. 27, 1887 |
| 1,345,518 | Van Brunt | July 6, 1920 |
| 1,918,959 | Culp | July 18, 1933 |
| 1,925,352 | Twombly | Sept. 5, 1933 |
| 1,939,970 | Fuess | Dec. 19, 1933 |
| 1,990,653 | Kollsman | Feb. 12, 1935 |
| 1,996,330 | Goshaw | Apr. 2, 1935 |
| 2,102,856 | Russell | Dec. 21, 1937 |
| 2,193,581 | Clokey | Mar. 12, 1940 |
| 2,199,416 | Paulson | May 7, 1940 |
| 2,267,976 | Hermann | Dec. 30, 1941 |
| 2,316,075 | King | Apr. 6, 1943 |